RESONATOR AND VELOCITY MODULATION DEVICE USING SAME

Filed June 21, 1954 3 Sheets-Sheet 1

INVENTOR.
Marvin Chodorow
BY Paul B. Hunter
ATTORNEY

RESONATOR AND VELOCITY MODULATION DEVICE USING SAME

Filed June 21, 1954 3 Sheets-Sheet 2

INVENTOR.
Marvin Chodorow
BY Paul B. Hunter
ATTORNEY

July 12, 1960 M. CHODOROW 2,945,155

RESONATOR AND VELOCITY MODULATION DEVICE USING SAME

Filed June 21, 1954 3 Sheets-Sheet 3

INVENTOR.
Marvin Chodorow
BY
Paul B. Hunter
ATTORNEY

United States Patent Office 2,945,155

Patented July 12, 1960

2,945,155

RESONATOR AND VELOCITY MODULATION DEVICE USING SAME

Marvin Chodorow, Menlo Park, Calif., assignor to Varian Associates, San Carlos, Calif., a corporation of California Filed June 21, 1954, Ser. No. 437,947

26 Claims. (Cl. 315—5.39)

Figures 1, 1A, 2:
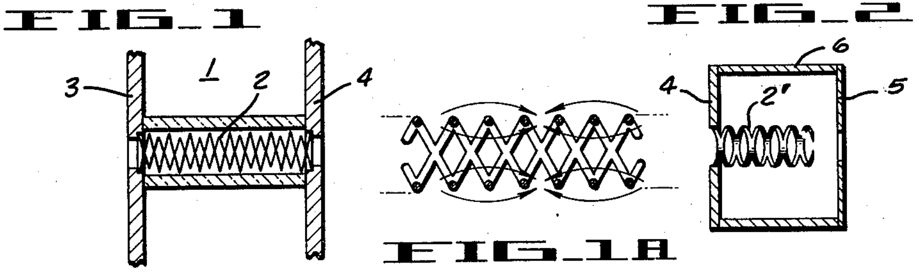

The present invention relates to novel resonator cavities and to velocity modulation devices embodying one or more of said resonator cavities and designed to operate as microwave frequency amplifiers, oscillators or as particle accelerators.

When the need and desirability for amplifier and oscillator tubes operable at microwave frequencies first arose because of the inability of conventional low-frequency tubes to perform at these higher frequencies, velocity-modulation devices, such as the klstron, were invented to meet that need. While klystrons, generally, are very well adapted for use as both oscillators and amplifiers at microwave frequencies, having good gain characteristics and being operable at low and high power levels (i.e., up to 30 megawatts), they are, however, subject to certain limitations.

As an example, they are subject to the same limitation with respect to frequency bandwidth as the conventional low-frequency tubes. More accurately, the limitation is directed to the gain-bandwidth product as determined by the inherent character of the klystron cavity resonator wherein the electron beam interacts with the radio-frequency field existing at the cavity gap. The gain-bandwidth product of a cavity resonator is directly proportional to the quantity $$\frac{R_{sh}}{Q}$$

where $R_{sh}$ is the shunt impedance of the cavity upon which the gain of the tube is dependent and Q is a quality factor determinative of the bandwidth. In a conventional resonator cavity wherein the shape and size are largely determined by the desired resonant frequency, any change or modification which affects the value of $R_{sh}$ similarly varies Q so that the gain-bandwidth product can be considered as substantially a constant. If greater bandwidth is desired in a particularly klystron, gain must, as a consequence, be sacrificed.

Efforts have been made to refine the design of klystrons to minimize the effects of this limitation as well as others with respect to significant factors such as efficiency and tunability, but the fundamental limitations have remained.

It is an object of the present invention to provide an improved resonator cavity enabling the construction of velocity modulation devices which are highly effective at microwave frequencies, circumventing limitations such as those mentioned with respect to klystrons.

It constitutes a feature of the invention to provide velocity modulation devices of varied types, each incorporating the novel cavity resonator.

It is another feature to provide a novel cavity resonator which, when incorporated in a velocity modulation device such as a klystron, produces a high degree of interaction between the electron beam and the radio frequency field so that better "bunching" of the beam results.

A further feature of the invention is to provide a novel cavity resonator which enables, when incorporated into a velocity modulation device, the attainment of a greater gain-bandwidth product, increased tunability and higher efficiency than is achieved, for example, in existing klystrons.

An additional feature of the invention is to provide a novel cavity resonator which, when incorporated in an electron tube structure, facilitates the utilization of magnetic focusing of the electron beam.

Still another feature of the invention is to provide a novel cavity resonator which can be incorporated to particular advantage in a tube of the reflex klystron type.

Additionally, it is a feature of the invention to provide a novel cavity resonator which serves as a functional and/or structural basis for the fabrication of new and improved types of velocity modulation devices, such as klystrons, electron and proton accelerators, and the like.

Figure 3:
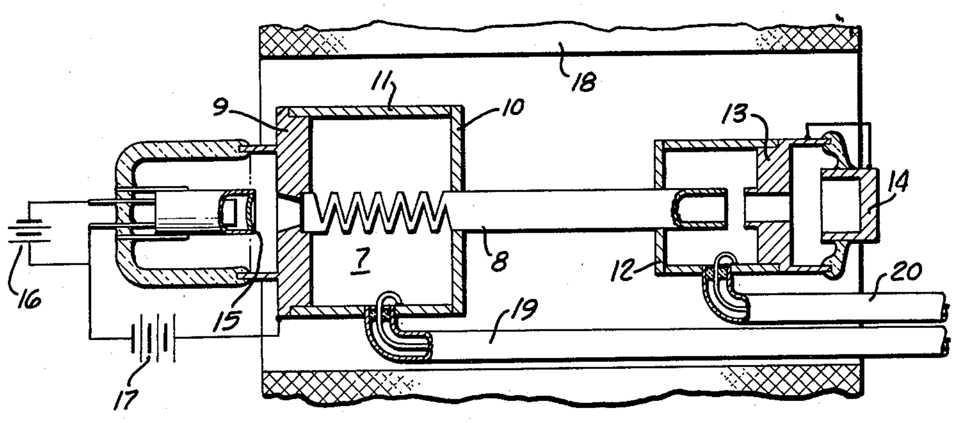
Figure 4:
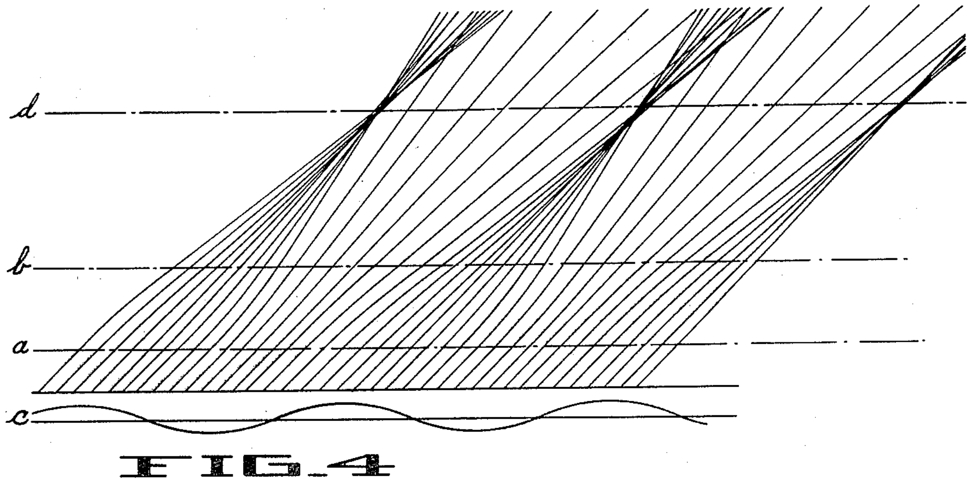
Figure 5:
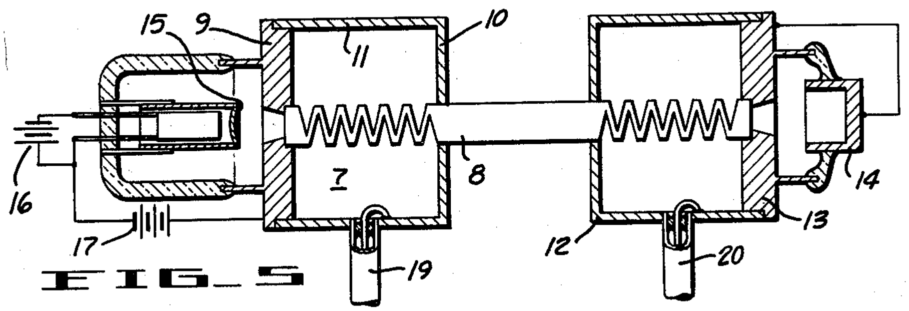
Figure 6:
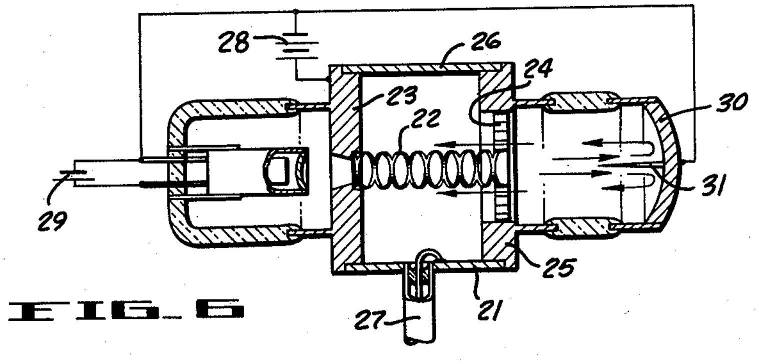
Figure 7:
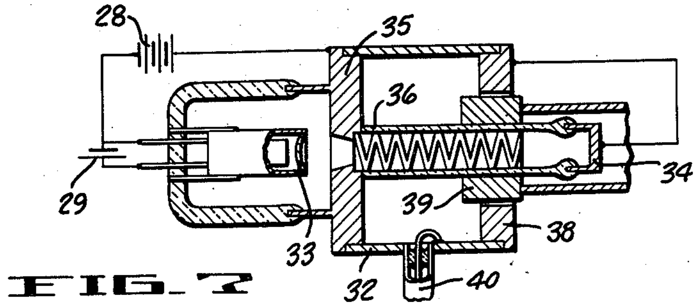
Figure 8:
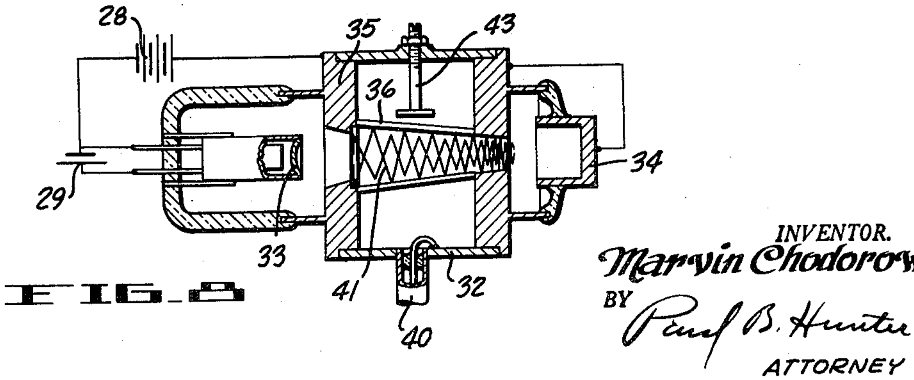
Figure 10:
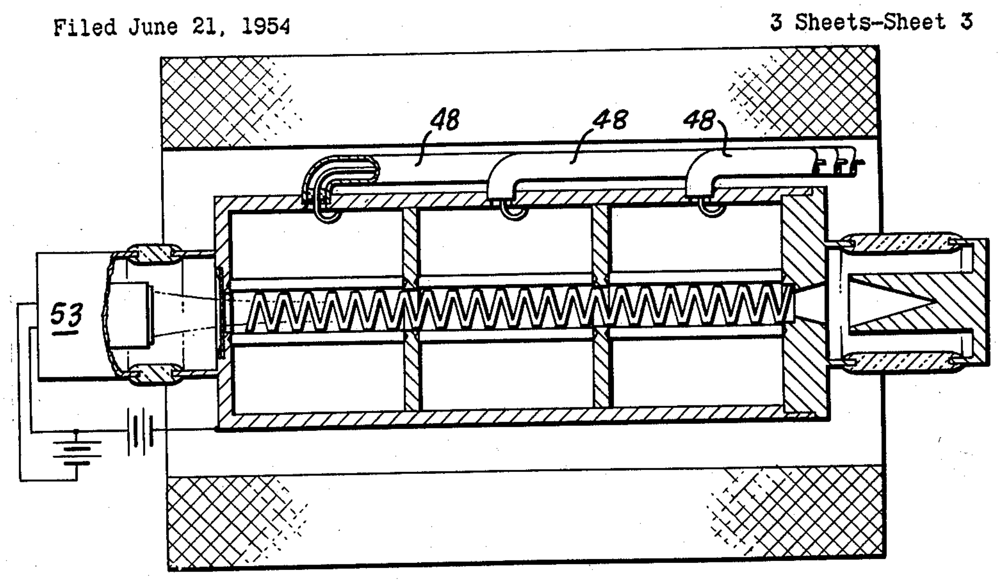
Figure 9:
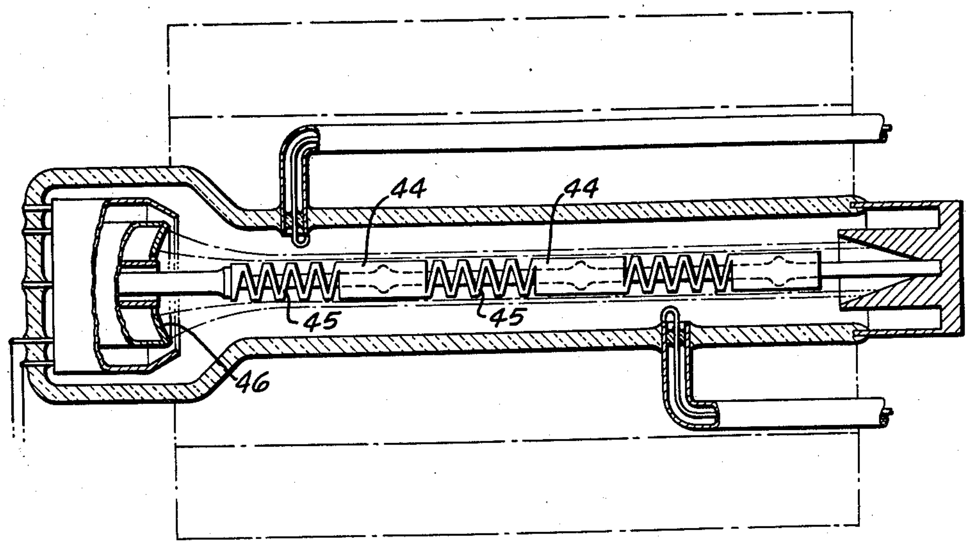

Other features of the present invention as well as the advantages stemming therefrom will become more apparent from a perusal of the following description of the accompanying drawings wherein Fig. 1 is a sectional view of one embodiment of the present invention showing a cross-wound helix cavity structure, Fig. 1*a* is a schematic view illustrating typical instantaneous fields along the length of the cross wound structure forming the cavity shown in Fig. 1, Fig. 2 is a view generally similar to Fig. 1 showing however a different cavity construction, Fig. 3 is a central sectional view of a velocity modulation device embodying a cavity constructed in accordance with the invention, Fig. 4 is an Applegate diagram illustrating the modulation of the electron velocity in the device shown in Fig. 3, Fig. 5 is a central sectional view of a velocity modulation device incorporating two of the novel cavities, Fig. 6 is a central sectional view of another electron tube of the reflex klystron type embodying the present invention, Fig. 7 is a similar view of a single cavity oscillator tube embodying the present invention, and illustrating a novel tuning arrangement therefor, Fig. 8 is another view of an embodiment of the invention wherein a modified form of cavity is employed in an oscillator tube, Fig. 9 is a sectional view of an amplifier tube employing the structure of the present invention, and Fig. 10 is a sectional view of a proton accelerator employing the principles of the present invention.

Similar reference numerals are used in certain of the above figures to indicate corresponding parts.

Essentially the present invention involves the provision of a resonator cavity including a metallic slow wave helical structure adapted to propagate a radio frequency wave and having discontinuities at each end thereof whereby standing waves are produced. The structure is given a geometry such that interaction between the radio frequency field traveling along the slow wave structure and a directed beam of charged particles traveling longitudinally of and adjacent to the slow wave structure is enabled.

As shown in Fig. 1, a cavity resonator 1 embodying the invention is shown as including a slow-wave structure 2 in the form of a pair of cross-wound helices having substantially the same diameter and equal but opposite pitch, such a slow-wave structure having been disclosed in a co-pending application Serial No. 385,357, filed October 12, 1953, for Electron Discharge Device, and now U.S. Patent No. 2,836,758. These helices may be formed of tungsten wire or other suitable conducting material and are rigidly supported within a glass or ceramic tube although in some instances this tube may be omitted or replaced with supporting rods as of ceramic. In accordance with the present invention, the helices are electrically connected at both ends to suitable discontinuities, for example, conducting or shorting plates 3 and 4, as of copper, serving as reflectors, whereby these discontinuities cause standing waves to be set up on the helices when a radio frequency wave is applied. The standing waves are set up only because the cross-wound helix structure is symmetrical or, in other words, has no sense of rotation, so that the reflected wave will be substantially entirely in the same mode as the incident wave. A single helix could not be used with a plane reflector since it would produce a reflection in improper mode to obtain a suitable standing wave.

Since the standing waves will be present the full length of the helices, the resultant radio frequency field will be distributed over the entire length of the resonator cavity formed by the described structure rather than at but a single gap position as in a conventional klystron cavity. At any given instant the axial field inside and outside the helices will alternate in polarity along the axis with the spacing between alternate peak polarities being determined by the diameter and pitch of the helices. This polarity reverses every half cycle of the oscillating frequency. Thus an electron with the right velocity such as to carry it from one peak to the next in a half cycle will see substantially a field of the same direction throughout its entire transit. Thus Fig. 1*a* illustrates the instantaneous distribution of the electric field components by arrows, i.e., the electric field components distributed along a portion of the length of the cross-wound helix structure. Stated differently, a standing wave in a structure of this kind consists of a super-position of two running waves going in opposite directions. With the electrons moving in the same direction as the forward moving wave and at substantially the same velocity it will be influenced cumulatively by that wave and negligibly by the reverse wave. Since it is moving at substantially the same velocity as the forward wave the field of the effective wave as seen by the electrons will be unidirectional and substantially of constant magnitude. Furthermore, because of the cross-winding of the helices, the axial component of the field will be accentuated.

In order that a beam of particles, such as electrons, can traverse the distributed field set up as described, the shorting plates 3 and 4 are centrally apertured. If it be assumed that a single electron is injected into the cavity from the left of Fig. 1 it will be exposed during its entire axial traverse to the strong axially-predominant field of the forward running wave and a strong interaction or energy exchange between the electron and the distributed radio-frequency field will be attained. The resultant velocity-modulation of the electron will be considerably greater than that attainable in a conventional klystron cavity. It has been determined mathematically that whereas the so-called bunching efficiency, which is a measure of the interaction attainable, of a conventional cavity is but 58%, an efficiency of 78% is theoretically attainable in a distributed field cavity, as herein disclosed.

For any given frequency, the velocity of the wave will depend on the radius, pitch and other dimensions of the helices. If for any given angular frequency the phase velocity of the fundamental components is V, then one can define a propagation constant of the fundamental components $$\beta=\frac{\omega}{V}$$

and if one makes the length L of the resonator to approximately satisfy the relation $\beta L=\pi$, $2\pi$, $3\pi$, etc., one can then produce the standing wave described above at the angular frequency $\omega$ and the number of field peak polarities such as shown in Fig. 1*a* will be 1, 2, 3, etc., corresponding to $\beta L=\pi$, $2\pi$, etc.

This lack of any limitation on the length of the distributed field cavity enables the gain-bandwidth product of such a cavity to be varied, this constituting the property of major importance of this novel cavity and the property which most clearly indicates its departure from the conventional klystron cavity where, as previously mentioned, the gain-bandwidth product is substantially a constant.

This important property of the cavity embodying the present invention can briefly be explained in the following manner. As previously discussed, the gain-bandwidth product of a cavity is determined by the value of $$\frac{R_{sh}}{Q}$$

For a distributed field cavity, $$\frac{R_{sh}}{Q}$$

is directly proportional to the length of the cavity, $R_{sh}$ increasing with the length while Q remains substantially constant. In terms of traveling wave tube parameters as employed by Pierce, $$\frac{R_{sh}}{Q}\text{ per unit length}=\frac{\pi F^2}{2\lambda}\left(\frac{C}{V}\right)^3\frac{V_g}{V}$$

where

F is a dimensional factor
$\lambda$ is the wavelength
C is the velocity of light
V is the phase velocity of the fundamental component, and
$V_g$ is the group velocity Since there is no limitation, other than a purely practical one, on the length of the cavity, there is, consequently, no limitation on the value of $$\frac{R_{sh}}{Q}$$

and the gain-bandwidth product determined thereby.

In Fig. 2 is shown a modified cavity embodying the present invention and having the desirable properties discussed hereinabove. A structure 2' topologically equivalent to cross-wound helices is formed from a tube which is appropriately slotted in the manner indicated in my copending application referred to hereinabove, thus producing a rigid, self-supporting structure. This structure or other topologically equivalent structure such as the ring and bar or other structure shown in my prior application, now U.S. Patent No. 2,836,758, may be used. A discontinuity is established at one end of the structure by a shorting plate 4 to which the slotted tube is secured as by brazing. A second shorting plate 5 is disposed in spaced relation from the free end portion of the slotted tube whereby a capacitive gap is formed. This type of discontinuity corresponds to a capacitive termination of a conventional transmission line in that the disposition of the standing waves produced, when radio frequency energy is applied, is shifted from that which would result from a shorted line. The second plate is supported in its desired disposition by a cylindrical metal tube 6 whose diameter is somewhat greater than twice that of the cross-wound helices so that while it effectively shields the radio frequency field from outside agencies, it does not itself disturb the field distribution. Having a smaller diameter of cylinder 6 will result in changing the resonant frequency of the cavity somewhat although the effect will be small until the diameter of cylinder 6 gets to be only slightly larger than the diameter of tube 2'.

The cavity comprising the cross-wound helices or any topologically equivalent structure having discontinuities at each end can be utilized in much the same manner as the conventional klystron cavity in various velocity modulation devices, but, because of its different properties, can also form the basis for the construction of tubes which have no counterpart among those incorporating the conventional cavity.

A cavity, constructed in accordance with the present invention, is shown in Fig. 3 as the buncher cavity in a two-cavity klystron amplifier. This buncher cavity 7 is composed of a symmetrical slow wave structure shown formed by a slotted portion of an elongated cylindrical tube 8, each end of this slotted portion of the tube being concentrically secured between a pair of annular shorting plates 9 and 10 that are joined at their peripheries by a cylindrical electric shield 11, as of copper, the joints constituting a vacuum-tight braze.

The intermediate portion of the cylindrical tube forms a drift space therewithin and the free end portion of the tube 8 enters a conventional klystron cavity resonator 12 to form one side of the capacitive gap therein. The other side of the gap is formed integrally within the end wall 13 of the conventional cavity which wall is centrally apertured to permit the passage of electrons to a collector electrode 14 suitably mounted in vacuum-tight relation to the end of the conventional cavity so as to be in direct alignment with the described aperture and cylindrical tube 8. Electrons are emitted from a suitable electron gun 15 sealed to the described buncher cavity. The electron gun includes a cathode in alignment with the described cylindrical tube 8 and is energized by a suitable heater (not shown) when voltage is supplied thereto from a heater source 16, shown as a battery. The emitted electrons are accelerated by the application of a positive voltage to the body of the device from a second battery 17 and are directed through the cylindrical tube by suitable focusing means, herein diagrammatically illustrated as a solenoid 18.

Radio frequency energy supplied to the first or buncher cavity through a coaxial coupler 19 causes the electrons passing through the slow wave structure formed by the slotted portion of the cylindrical tube 8 to be velocity modulated. As the electrons pass thereafter through the drift space in the intermediate portion of the cylindrical tube, they begin to form bunches, the bunching reaching a maximum as they cross the capacitive gap in the second or catcher cavity 12. The radio frequency energy developed in the catcher cavity is drawn out through another coaxial coupler 20 and the spent electrons continue their traverse to eventually impinge on the collector electrode 14 which is connected to the body of the device by a lead, and therefore has the same positive potential relative to the cathode. If desired, the tube may be slotted all along its length with discontinuities at spaced points along the length thereof, thereby eliminating the drift space in which case velocity and density modulation takes place continuously along the length of the slow-wave structure.

The modulation obtained in the amplifier of Fig. 3 employing a drift space is expressed graphically in Fig. 4 in an Applegate diagram wherein distance is plotted against time and the disposition of a number of electrons is indicated throughout their traverse of the device. It will be particularly noted that between lines *a* and *b* which represent the beginning and end of the buncher cavity, which is constructed in accordance with the present invention, a continuous change in the electron velocity of a majority of the electrons occurs, as indicated by the curvature of the individual electron "line." The applied radio frequency wave is plotted beneath the diagram as indicated at *c* and the position of the capacitive gap in the conventional catcher cavity is indicated at the line *d* which it will be seen corresponds to the point at which maximum bunching of the electrons obtains.

In Fig. 5, a modified amplifier is shown which embodies a distributed field cavity constructed in accordance with the present invention in both the position of buncher and catcher cavity. The structure and operation of this amplifier is somewhat similar to the amplifier shown in Fig. 3 though the tube of Fig. 5 has greater bandwidth and other differing characteristics. The catcher cavity may have dimensions differing from that of the buncher so as to optimize the performance as to bandwidth and power output. Also, a series of cavities may be employed between the buncher and catcher as when a multi-resonator amplifier is desired. Consequently, this amplifier can be employed efficiently over a greater frequency range than the amplifier shown in Fig. 3.

A distributed field cavity constructed in accordance with the present invention can also be utilized to particular advantage in a velocity modulation device, as shown in Fig. 6, which is generally similar to a conventional reflex klystron. The cavity 21 is formed by cross-wound helices constituting a slotted tube 22 which are shorted at one end by an annular plate 23 and at the other by an annular grid 24. This grid is secured within an exterior annular plate 25 joined to the first plate by a cylindrical shield 26. A coaxial coupling probe 27 extends through the shield to enable the extraction of radio frequency energy.

The energy is generated when electrons are injected into the cavity from an electron gun whose cathode is biased negatively relative to the cavity by a suitable battery 28 and is heated by a heater energized from a second battery 29. The electrons are velocity modulated as they pass through the cavity and thereafter approach a reflector 30, which is connected to the cathode so as to be negatively biased and is shown embodying a central spike 31. Consequently the electrons are repelled and reverse their direction of motion. Rather than returning axially through the cross-wound helices, they, because of the configuration of the reflector spike, return as an annular beam whose path is through the described annular grid 24 and thence exterior of the helices to the first shorting plate of the cavity. If the spike is omitted the beam will return within the helices which is another way of operating the tube. Since the field on the helices is strong exteriorally as well as interiorally thereof, good interaction takes place, and the bunched electrons therefore generate the radio frequency energy desired. If desired, any of the structures shown in the drawings could be used with a hollow electron beam coacting with the field surrounding the cross-wound helix structure. Such a structure is shown in Fig. 9 wherein tube discontinuities 44 are disbursed between successive cross-wound helix structures 45 and a hollow beam emitted from annular cathode 46 passes in surrounding relation to said slow-wave structure.

Since, as previously discussed, the length of a distributed field cavity is not limited, it will be apparent that if a sufficiently long cavity were provided, not only velocity modulation of the electrons but their attainment of the point of maximum bunching might well occur within one cavity so that a novel type of oscillator would result. If the beam voltage is suitably chosen these bunchers can deliver energy to the field and maintain oscillation. Such an oscillator is illustrated in Fig. 7 wherein a distributed field cavity 32 is supported between an electron gun 33 and a collector 34. The cavity itself constitutes cross-wound helices shorted at one end by an annular plate 35 and encompassed through the remainder of their length by a glass or ceramic tube 36 which mounts the collector 34 at its far end and in effect is a portion the vacuum envelope of this device. A cylindrical shield is secured between the annular shorting plate 35 and a second annular plate 38 having an inner diameter such as to enable the sliding insertion of an annular tuning shortening slug 39 between it and the exterior of the glass or ceramic tube. When this slug 39 is moved, the effective shorting position on the helices is shifted which then results in a variation in the frequency of this oscillator. Also, slight variations in the velocity of the electrons accomplished by means of changes in the acceleration voltage, can alter the relative phase of the bunched current and the field in the cavity and this will result in a change in frequency as in a reflex or floating drift tube klystron. This would then provide a means of electrically tuning such an oscillator. A suitable coaxial coupling probe 40 is provided to enable withdrawal of the generated radio frequency energy whatever its frequency may be.

An oscillator modified slightly from that shown in Fig. 7 is illustrated in Fig. 8. The cross-wound helices 41 are tapered inwardly in diameter in the direction of electron motion and a corresponding decrease in pitch is made so that the phase velocity of the radio frequency wave is maintained constant. The diameter of the helices at the input end of the cavity can be two or three times the diameter of the electron beam tapering thereafter to approximately the beam diameter. Since the field on the helices is strongest immediately adjacent the output end, greater interaction is had at the output end of the cavity where the electrons are bunched to thus enable a more effective extraction of energy from the electron beam. Tuning means shown as a movable member 43 is indicated as projecting toward the helices 41.

It is believed apparent that many other velocity-modulation devices may incorporate one or more of the distributed field cavities constructed in accordance with the present invention so as to derive the described advantages thereof. In particular, it can be mentioned that a series of such cavities might well be employed as a proton accelerator as shown in Fig. 10, to enhance the effectiveness thereof in much the same manner as hereinabove described with respect to specific velocity modulation tubes. Thus in the structure of Fig. 10 a series of cross-wound resonators are used and the dimensions of the helices of successive cavities may be changed to correspond to progressive changes in proton velocity. In other words, the cross-wound helix of such a tube may have discontinuities distributed along the length thereof together with connected supply lines 48 of driving electromagnetic energy establishing thereby a plurality of driven resonators all of which are additive in accelerating protons projected from a suitable source 53 and passing within the resonators.

Various modifications and alterations can obviously be made such as forming the slow-wave structure of cross sections other than circular without departing from the spirit of the invention. Therefore the foregoing description of the accompanying drawings is to be considered as purely exemplary and not in a limiting sense, the scope of the invention being indicated by the appended claims.

What is claimed is:

1. A velocity modulation tube comprising a buncher cavity, a catcher cavity aligned with said buncher cavity and separated therefrom by a drift space, means for injecting an electron beam into said cavities for successive traverse of said buncher cavity, said drift space and said catcher cavity, a collector for collecting the electrons in said beam after their traverse, said buncher cavity constituting means topologically equivalent to a cross-wound helix provided with reflective discontinuities to form a distributed field cavity.

2. A velocity modulation tube according to claim 1 wherein said distributed field cavity has electrical conducting members forming electromagnetic reflectors adjacent the ends thereof.

3. A velocity modulation tube according to claim 1 wherein said catcher cavity constitutes means topologically equivalent to a cross-wound helix provided with reflective discontinuities to form a distributed field cavity.

4. A velocity modulation tube comprising, means topologically equivalent to a cross-wound helix provided with reflective discontinuities to form a distributed field cavity, an electron gun adapted to provide and direct an electron beam through said cavity, and a reflector electrode to cause the electrons to return through said cavity subsequent to their first traverse thereof.

5. A velocity modulation tube according to claim 4 wherein said distributed field cavity constitutes a cross-wound helix type structure shorted at both ends.

6. A velocity modulation tube according to claim 5 wherein said reflector is arranged to cause the electrons on their return passage through said cavity to pass adjacent the surface of said cross-wound helix type structure.

7. A velocity modulation tube according to claim 6 wherein the short formed at one end of said helices constitutes a grid.

8. A velocity modulation tube comprising an electron gun adapted to provide and direct a beam of electrons, a collector aligned with said gun to collect electrons in the directed beam, and means topologically equivalent to a cross-wound helix provided with reflective discontinuities to form a distributed field cavity interposed between said gun and said collector so as to be traversed by the electron beam.

9. A velocity modulation tube according to claim 8 wherein said distributed field cavity is of a length such that the electrons are velocity and density modulated so as to be bunched prior to egress therefrom.

10. A velocity modulation tube according to claim 9 wherein said distributed field cavity is formed by cross-wound helix type structure shorted at both ends.

11. A velocity modulation tube according to claim 10 wherein the short at one end of said helices constitutes a movable member.

12. A velocity modulation tube according to claim 10 wherein said cross-wound helix type structure varies in diameter and pitch from one end of said cavity to the other end thereof.

13. A velocity modulation tube according to claim 12 wherein the variation in diameter and pitch is so correlated as to maintain a substantially constant phase velocity of an applied radio frequency wave.

14. A velocity modulation tube for accelerating protons comprising means for projecting protons in the form of a stream, and a plurality of means topologically equivalent to cross-wound helices provided with reflective discontinuities to form a plurality of distributed field resonators arranged in longitudinal alignment for receiving said stream for passage therealong, and means for setting up a traveling electromagnetic wave on said distributed field resonators to effect the acceleration of the protons.

15. A resonator cavity for velocity modulating charged particles including, means topologically equivalent to cross-wound helical wires slow wave structure, electrical conducting members adjacent said structure and serving as electromagnetic reflectors, whereby electromagnetic energy introduced onto said structure is reflected by said members producing standing electromagnetic waves therewithin, said cavity resonator being adapted to have a beam of charged particles interact with the standing waves thereof.

16. A resonator cavity according to claim 15 wherein an electrical conducting tuning member is movable with respect to the slow wave structure so as to perturb the field thereof to thereby change the resonant frequency of said cavity.

17. A resonator cavity according to claim 15 wherein said helical wire slow wave structure comprises cross wound helical wires, said helices being of substantially the same diameter and of equal and opposite pitch.

18. A resonator cavity according to claim 15 wherein one of said discontinuity forming members includes an electrical conducting member at one end of said slow wave structure so as to provide an electrical short circuit.

19. A resonator cavity according to claim 15 wherein one of said discontinuity-forming conducting members is spaced from the end of said slow wave structure so as to form a capacitive gap between the end of said slow wave structure and said conducting member.

20. A resonator cavity according to claim 19 wherein said capacitive-gap forming member is mounted for axial movable displacement relative to said slow wave structure.

21. A resonator cavity according to claim 15 wherein said slow wave structure is formed of cross wound helices.

22. In a high frequency apparatus a distributed field cavity resonator comprising means topologically equivalent to cross-wound helices forming a slow wave structure and having dicontinuities for delineating the electromagnetic field thereof along one axis of said resonator and between the discontinuities, and electromagnetic wave energy coupling means communicating with the field of said cavity resonator for transmitting wave energy to a suitable load, said resonator being adapted to have a beam of charged particles interact with the electromagnetic field thereof.

23. A distributed field resonator for interaction with a beam of charged particles including, means topologically equivalent to a cross-wound helical wire slow-wave structure, and electrical conducting members disposed adjacent said slow-wave structure spaced apart lengthwise thereof and serving as electromagnetic wave reflectors, whereby electromagnetic wave energy introduced onto said structure is reflected back and forth along said slow-wave structure and between said reflecting members thereby producing standing electromagnetic waves thereon for electromagnetic interaction with a beam of charged particles passable therethrough.

24. The apparatus according to claim 23 wherein said means topologically equivalent to a cross-wound helical wire slow-wave structure includes a wire wound into a helix.

25. The apparatus according to claim 23 wherein said electrical conducting members comprise apertured wall members disposed transversely of said slow-wave structure and spaced apart longitudinally thereof for producing standing waves on said slow-wave structure between said spaced apart transverse wall members.

26. A distributed field cavity resonator for interaction with a beam of charge particles passable therethrough including, a plurality of ring members coaxially disposed in spaced apart relation, conducting bar members interconnecting adjacent ring members, a first of said rings being interconnected to adjacent second and third rings by first and second bar members connected to said first ring member at diametrically opposite positions on said first ring member whereby a topologically equivalent cross-wound helix slow-wave structure is obtained, and means forming a conducting enclosure enveloping said slow-wave structure and being conductively connected to said slow-wave structure at longitudinally spaced apart points thereon to produce wave energy reflecting discontinuities at said spaced apart connections whereby electromagnetic wave energy introduced onto said structure is reflected by said envelope thereby producing standing electromagnetic wave on said slow-wave structure for interaction with a beam of charged particles passable through said coaxially disposed ring members.

References Cited in the file of this patent

UNITED STATES PATENTS

| | | |
|---|---|---|
| 1,978,021 | Hollmann | Oct. 23, 1934 |
| 1,991,282 | Kohl | Feb. 12, 1935 |
| 2,630,544 | Tiley | Mar. 3, 1953 |
| 2,653,270 | Kompfner | Sept. 22, 1953 |
| 2,789,247 | Jonker | Apr. 16, 1957 |
| 2,836,758 | Chodorow | May 27, 1958 |

FOREIGN PATENTS

| | | |
|---|---|---|
| 668,017 | Great Britain | Mar. 12, 1952 |

UNITED STATES PATENT OFFICE

CERTIFICATE OF CORRECTION

Patent No. 2,945,155 July 12, 1960

Marvin Chodorow

It is hereby certified that error appears in the printed specification of the above numbered patent requiring correction and that the said Letters Patent should read as corrected below.

Column 1, line 25, for "klstron" read -- klystron --; column 3, lines 32 and 33, for "runring" read -- running --; column 4, lines 22 to 24, for "$\frac{F^2}{2\lambda}$" read -- $\frac{F^3}{2\lambda}$ --; lines 46 and 47, for "produring" read -- producing --; column 6, line 67, for "shortening" read -- shorting --.

Signed and sealed this 13th day of December 1960.

(SEAL)
Attest:

KARL H. AXLINE
Attesting Officer

ROBERT C. WATSON
Commissioner of Patents